(12) United States Patent
Vaimberg-Araujo

(10) Patent No.: US 6,393,436 B1
(45) Date of Patent: May 21, 2002

(54) METHOD FOR COMMERCIALIZING GOODS AND SERVICES OVER A GLOBAL DIGITAL NETWORK

(75) Inventor: John David Vaimberg-Araujo, Urbanizacion Rosal sur Maracaibo (VE)

(73) Assignee: JV Export Trading Company, Inc., Miami, FL (US)

( * ) Notice: Subject to any disclaimer, the term of this patent is extended or adjusted under 35 U.S.C. 154(b) by 0 days.

(21) Appl. No.: 09/755,796

(22) Filed: Jan. 5, 2001

(51) Int. Cl.[7] .............................................. G06F 17/30
(52) U.S. Cl. ......................... 707/200; 705/35; 705/37; 705/38; 705/40
(58) Field of Search .................. 707/200, 10, 104; 705/35, 37, 38, 39, 40, 1, 23, 26, 28, 10

(56) References Cited

U.S. PATENT DOCUMENTS 5,963,924 A  * 10/1999  Williams et al. ............... 705/40
6,088,686 A  *  7/2000  Walker et al. ................. 705/38
6,119,093 A  *  9/2000  Walker et al. ................. 705/4
6,151,588 A  * 11/2000  Tozzoli et al. ................. 705/37
6,216,115 B1 *  4/2001  Barrameda et al. ........... 705/40
6,233,566 B1 *  5/2001  Levine et al. ................. 705/37
6,260,024 B1 *  7/2001  Shkedy ......................... 705/37

* cited by examiner

Primary Examiner—Sanjiv Shah
(74) Attorney, Agent, or Firm—J. Sanchelima

(57) ABSTRACT

A method for commercializing goods and services over a global digital network where the order requests from a group of purchaser subscribers is processed and matched with one or more vendor subscribers. Additionally, a purchaser subscriber credit needs are also processed and offered to a group of credit issuers who, according to their respective credit criteria, select those transactions in which they are interested. Additionally, a user is prompted for collateral, if necessary, to improve his/her qualifications. Similarly, a group of insurance carriers are exposed to the insurance needs of the credit users for the transactions being processed. As the transactions take place, the purchasers subscribers credit history is supplemented.

3 Claims, 2 Drawing Sheets

METHOD FOR COMMERCIALIZING GOODS AND SERVICES OVER A GLOBAL DIGITAL NETWORK

BACKGROUND OF THE INVENTION

1. Field of the Invention

The present invention relates to a business method for commercializing and delivering goods and services, and more particularly, to such a method that uses a global digital network.

2. Description of the Related Art

Many business methods have been designed in the past using communication network to offer goods and services to buyers. None of them, however, overcome the localized nature of the transactions unless strict credit requirements are met. There is no prior references for conducting sale and purchase negotiations through a network or other information media with credit terms. The present invention permits individuals or entities, or groups of them, interested in acquiring goods and/or services to avail themselves of a global communication network to match their needs with those of other individuals or entities—or groups of them—willing to sell goods and/or services. Additionally, and optionally, these buyers and sellers or groups of them, will have their transactions exposed to individuals or entities or groups of them—willing to extend credit and/or credit insurance if certain criteria is met. To facilitate these transactions, yet other individuals and/or entities or groups of them—may extend credit and/or credit insurance coverage upon meeting their own criteria. Information about the individuals, entities—or groups of them—and the transactions undertaken are constantly stored and updated in a computerized installation and other peripheral functions provided to facilitate the accounting and delivery of the goods and/or services instant payments or by extending credit and to simultaneously create credit history records through the network.

SUMMARY OF THE INVENTION

It is one of the main objects of the present invention to provide a method for conducting business using a global digital network that matches buyers with sellers with optional providers of credit and insurance service to facilitate the closing of the intended transactions.

It is another object of this invention to provide such a method that can be used by individuals and/or entities in any part of the world.

It is still another object of the present invention to provide such a method that helps maintain the costs down and efficiently permits different groups to contribute their services upon meeting their individual criteria.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1b is a continuation of FIG. 1a.

DETAILED DESCRIPTION OF THE PREFERRED EMBODIMENT

Figure 1A:
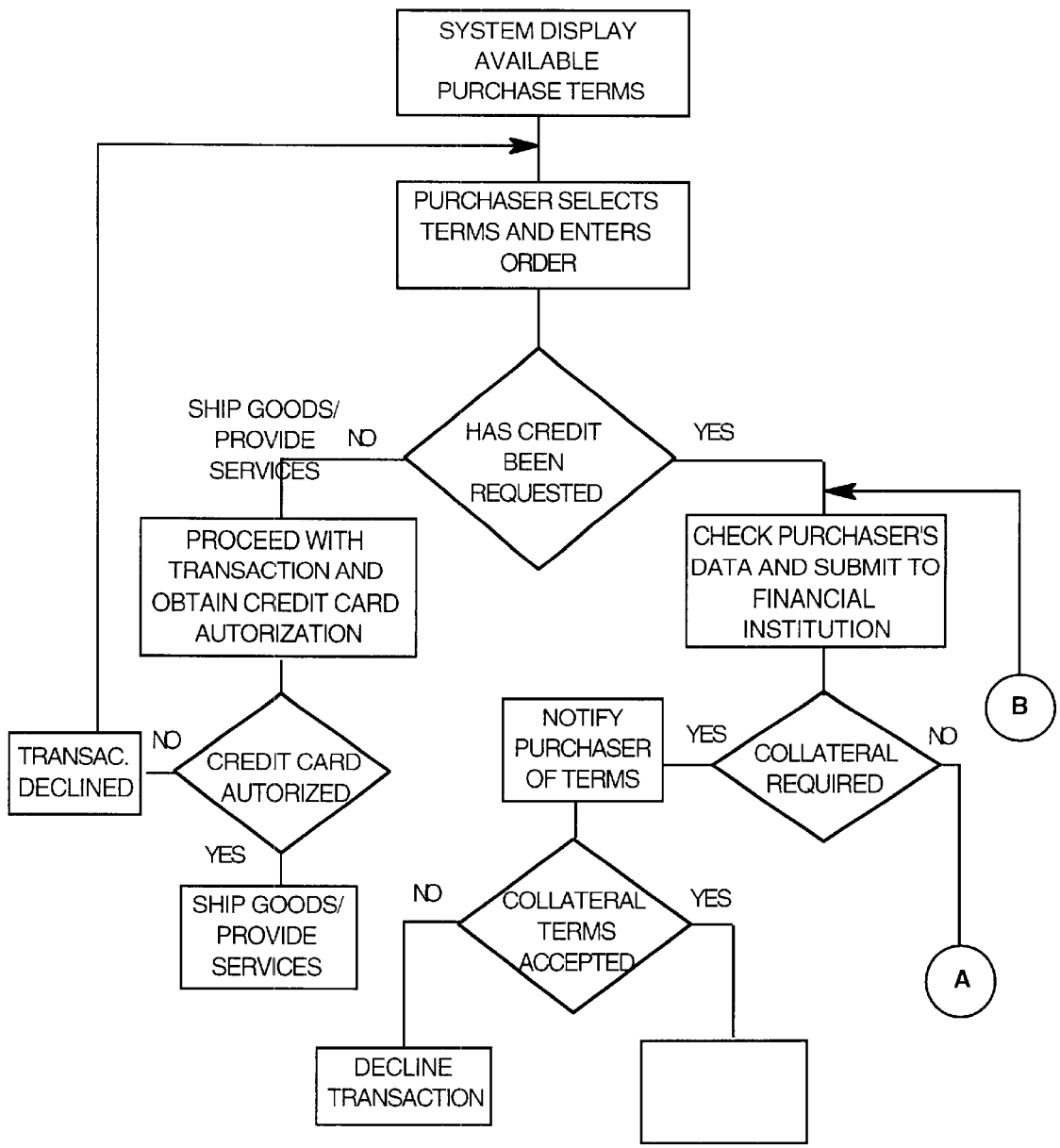
FIG. 1a represents one of the preferred implementations for the present invention using a global digital network.
Figure 1B:
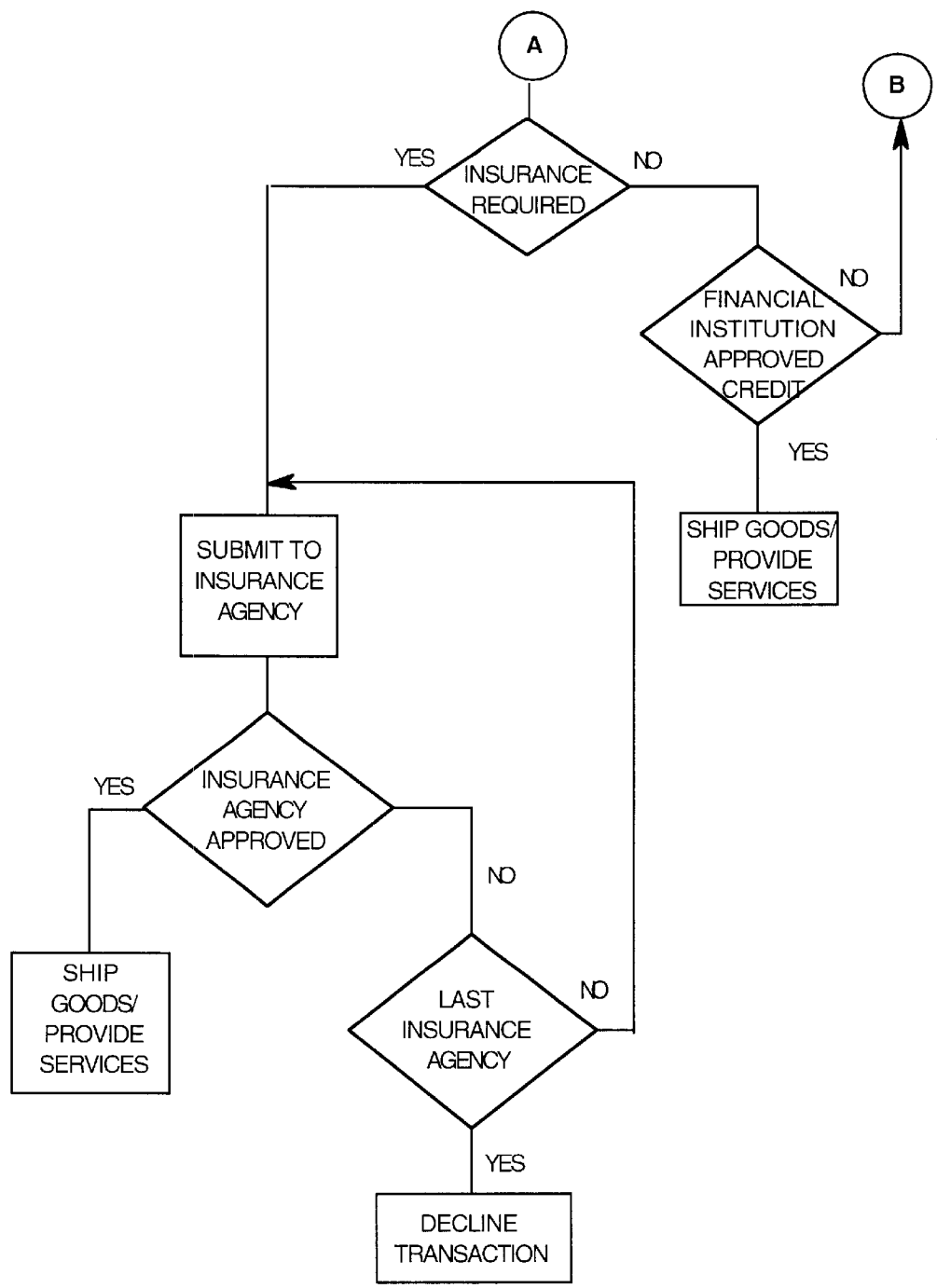

The present invention is generally referred to a business method for facilitating commercial transactions. It can be observed that it basically includes the use of a global digital network with a central computer installation equipped with data storage facilities. The method includes the creation of a database containing a list of buyers who subscribe to the use of the method and provide a predetermined amount of information including their particulars and other financial information. This information is stored in a buyers' database and each buyer is identified with a unique number and, optionally, passwords or other security devices.

A second group is created in another database, vendors database, that includes vendors who supply a predetermined amount of information and to whom a unique number is assigned. Access to their information is also limited through passwords or other means. Additionally, these vendors have the ability to link their digital catalog databases including the goods and/or services they offer and these catalog databases are under their control.

A third group is created in another database that includes individuals or entities or groups of them—willing to extend credit to the buyers if the intended transactions meet a predetermined criteria. These credit individuals or entities furnish a predetermined amount of information as well as a number of profiles of transactions that they are willing to finance.

Finally, a fourth group is created in yet another database that includes individuals and/or entities—or groups of them—willing to provide credit insurance policies for credits extended by one or more vendors if the intended transactions fall within one or more predetermined profiles.

These databases are accessible by the central computer installation for update and under certain restrictions, for marketing research. The central computer installation also maintains a user-friendly web portal for interacting with its subscribers and users and assigns a unique number to each request to purchase issued by the buyers, for the goods of a particular seller. The transaction is then matched, if necessary, with the credit subscribers and the buyer is then given an opportunity to select the individual or entity that will extend the credit. After this is done, the transaction is matched with the members of the insurance group and the seller shall have the option of selecting those with whom it/he/she wants to use. Of course, some of these assignments can be programmed to take effect automatically upon meeting yet another criteria for insurance terms and conditions.

The foregoing description conveys the best understanding of the objectives and advantages of the present invention. Different embodiments and equivalent procedures may be made of the inventive concept of this invention. It is to be understood that all matter disclosed herein is to be interpreted merely as illustrative, and not in a limiting sense.

What is claimed is:

1. A method for commercializing goods and services over a global digital network, comprising the steps of:

A) setting up and maintaining a first computerized database having a plurality of purchaser subscribers;

B) setting up and maintaining a second computerized database having a plurality of vendor subscribers having their respective digital catalog databases including at least one product or service;

C) setting up and maintaining a third computerized database having a plurality of credit issuers;
D) setting up and maintaining a fourth computerized database having a plurality of insurance carriers;
E) setting up and maintaining a portal with software to selectively link said first, second, third and fourth computerized databases;
F) assigning a unique order request number for each transaction initiated by any one of said purchaser subscribers to purchase one of said product or services;
G) matching each of said products or services with at least one of said credit issuers;
H) matching each of said products or services with at least one of said insurance carriers;
I) displaying all possible options for said transaction to the purchaser subscriber;
J) prompting the purchaser subscriber to select one of the options to close the transaction; and
K) performing against the order by communicating said order to the vendor subscriber to deliver the goods and/or services.

2. The method set forth in claim 1 further including the step of:

L) prompting a user to provide collateral assets for the transaction.

3. The process set forth in claim 2 further comprising the step of:

M) updating said first computerized database with credit information relating to transactions where particular purchaser subscribers participated.

* * * * *